April 1, 1958   W. F. BRADBURY   2,828,570
FISHING LINE AND LURE RETRIEVERS
Filed March 12, 1956
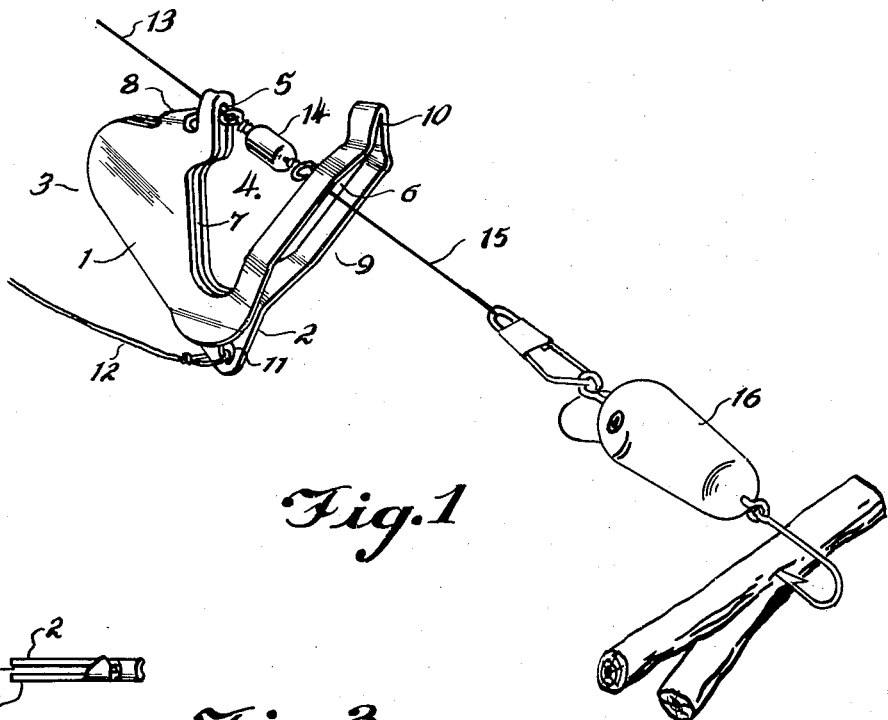
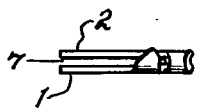
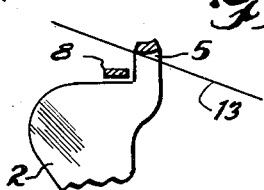
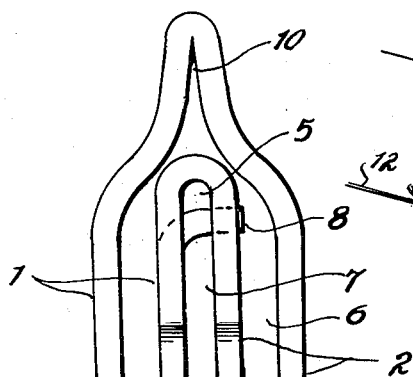
INVENTOR.
William F. Bradbury

United States Patent Office 2,828,570
Patented Apr. 1, 1958

2,828,570

FISHING LINE AND LURE RETRIEVERS

Wilburn F. Bradbury, Northbrook, Ill.

Application March 12, 1956, Serial No. 571,071

5 Claims. (Cl. 43—17.2)

This invention concerns fishing line and lure retrievers.

In the sport of Spin Casting, it is common practice to employ an extremely fine line to facilitate the throwing of small, light-weight lures. Some of these lines will break under tension of three pounds and although fish well over three pounds may be successfully landed by a skillful fisherman, it is difficult to free snagged lures. When the hook of the lure becomes lodged in submerged logs, weeds or rocks, it usually requires a much greater pull on the line than the line strength will permit to dislodge the lure or to raise the object to which it is caught. When exerting such necessary force, the line will part some place between the reel and the lodged hook. Quite often the hook becomes snagged at the end of the cast; as this can be as much as one hundred feet, the breaking off of this much line several times will render the rest of the line useless for skillful fishing.

Another difficulty which is encountered when fishing with such lightweight lines occurs when the angler is a distance above the water, as on a bridge or pier. Under these conditions it is impossible to lift a fish which weighs more than the breaking strength of the line. A long handled landing net has to be employed or the angler must walk his fish to the nearest shore and beach it. Both of these methods are often impracticable.

It is a general object of this invention to solve these above mentioned problems by the use of my simple, one-piece, non-corrosive device which can be easily carried in a fisherman's pocket.

A more particular object of my invention is to provide a device which will enable an angler to exert a much greater pull upon a lodged hook than the fishing line will permit to facilitate recovery of the lure.

Another object is in the provision of a device which will enable an angler to recover most of his line even though the lure or hook cannot be dislodged.

A still further object is to provide a means to lift a fish out of the water when the fish has more weight than the line will support.

The attainment of these and other subordinate objects has been achieved by the following fully described device and which novel features have been incorporated in the appended claims.

In the drawings:

Figure 1 is a perspective view of the device on a line.

Figure 2 is an enlarged view of both eyes as seen from the front.

Figure 3 is a fragmentary sectional view in plan and elevation of the left eye.

Figure 4 depicts the device in position over a knot.

Figure 5 depicts the device when gripping a knot.

Referring now to the drawings, the device depicted in Figure 1 is a stamping of stainless steel or equivalent non-corrosive material consisting of two similar halves 1 and 2 folded back upon themselves to form a body 3. The upper cut-out area 4 defines two separate eyes 5 and 6. The left hand eye 5 has a clearance slot 7 leading into it which is formed by the sides 1 and 2. At the top of the side 1 and to the left of the eye 5 is a tab 8 which is bent across the slot 7 to form a stop to retain a line in the eye 5. This tab 8 has an angular left hand edge as seen in the plan view of Figure 3. Figure 3 depicts a curve section at the top of the eye 5 to allow for smooth sliding of the device on a line.

A rightwardly extending arm 9 has its two sides 1 and 2 spread apart wide enough to allow clearance for a swivel or other leader attaching device, or a mere enlargement such as a knot tied in the line. The two sides of this arm 9 are bent back to the sides 1 and 2 as shown in Figure 1 to form the larger eye 6. Having reference to Figure 2, it can be seen that the eye 6 is pinched together at the top to form a sharp V-notch as at 10.

At the bottom of the retriever body 3 and in the side 2 thereof is a hole 11 through which is tied a strong tether 12. The shorter side 1 is bent out slightly at the bottom to facilitate the insertion of a line.

The top converging part of the arm 9 is parallel to a line between the eye 5 and the hole 11 to enable the V-notch 10 to most efficiently catch an enlargement of the line as will be hereinafter explained.

The above disclosed device has its center of gravity to the left of the center of the eye 5 when the body 3 is hanging freely from a line passing through the eyes 5 and 6. The body will hang solely from the eye 5 regardless of the angle of the line; thus the V-notch 10 of the eye 6 will be well above the line and swivel or other enlargement.

The method of employing my invention will now be disclosed:

Having reference to Figure 1, it may be seen that a fishing line 13 having a swivel 14 and a lure 16 attached thereto through the leader 15 extends downwardly at an angle. This line 13 is fairly taut due to the pull of the rod at one end and the snagged hook of the lure at the other. The device is threaded onto the line by passing the line up between the two sides 1 and 2 and sliding it around the angular edge of the tab 8 so that it passes freely through the left eye 5 and the right eye 6. The device is now slid down the line to the lure by paying out the tether 12. When the eye 5 comes in contact with the wire loop behind swivel 14, the swivel will have passed through the eye 6 and the U-notch 10 will be over the leader 15. The fisherman now pulls on the tether 12 to cause the device to pivot clockwise about the eye 5. The V-notch 10 is lowered onto the leader wire 15 and subsequent pulling on the tether 12 will cause the device to slide up the leader until the V-notch 10 is stopped by either the wire loop ahead of the swivel or by the barrel of the swivel. As the communication between the fisherman and the lure is now through the strong tether 12 and the leader 15, enough force can be exerted to raise the object to which the lure is attached or to dislodge the lure either by breaking off a piece of the submerged object or straightening of the hook or to break the leader.

In order to be able to salvage most of the line in cases where weeds or other obstructions prevent the device from sliding all the way to the swivel or other hook attaching device, it is necessary to provide some enlargement of the line for the device to catch onto. A knot tied in the line is sufficient for this purpose. It may be the knot which forms a loop at the end of the line for attaching a hook or it may be a single overhand knot tied anywhere in the line in the vicinity of the hook. Having reference to Figure 4 the eye 6 has passed over a knot 17 of the line 13. Figure 5 illustrates what occurs when the tether 12 is pulled. The body 3 turns clockwise about the eye 5 and the V-notch 10 of the eye 6 is lowered onto the line. Further pulling upon the tether 12 causes the line 13 to be kinked between the top of the tab 8 and the top of the eye 6 to force the line into the V- notch 10. The body 3 will slide along the line 13 until the knot 17 obstructs further sliding. Continued pulling on the tether 12 will either dislodge the hook or break the line 13 below the knot 17.

A further innovation is presented and that is: When it is necessary to raise a large fish or other object above the water as up to a pier or bridge, the device is threaded on the line as before and then lowered down to the swivel, the phantom line 13a on Figure 4 indicates the fishing line under this condition. Pulling on the tether will pivot the device to cause it to grab the swivel and allow the fish to be hoisted up by the leader.

Having described a preferred embodiment of my invention, what is claimed as new is:

1. For use with a fishing line provided with a lure at its forward end and an enlargement near the lure, the line from the enlargement to the lure being of greater strength than the line between the enlargement and the angler; a retriever comprising a body having an open eye by which said body is suspended from the line; a projection rigidly attached to said body and spaced forward of said eye a distance greater than the length of the enlargement on the line; said projection having an opening aligned with said eye; said opening in said projection being of at least two different widths, one of said widths being greater than the width of the enlargement on the line, and the other of said widths being less than the width of the enlargement of the line; the center of gravity of said body being positioned so that when the retriever is connected to said line the portion of said opening in said projection having the lesser width will be normally disposed above said line; a tether attached to said body whereby tension on said tether tilts the retriever body on said line to cause the portion of the opening in said projection having the lesser width, to be lowered around the line to abut, the enlargement on the line for freeing the hook or to break the same from the line forward of the enlargement.

2. A fishing line and hook retriever for use with a line provided with a lure at its forward end and an enlargement near the lure, the line from the enlargement to the lure being of greater strength than the line between the enlargement and the angler comprising: a retriever body of similar contiguous halves; said halves forming a slot to receive the line; a first eye at a fold of the halves and open into the slot to provide a sliding guide for the body on the line; a protuberance of one of the halves across the slot and adjacent the first eye to retain the line therethrough; a second eye aligned with said first eye and formed by a fold of the halves; said first and second eyes separated a distance greater than the length of the enlargement on the line; said second eye being of two different widths, a width greater than the width of the enlargement on the line and a width less than the width of the enlargement; normally disposed said latter width above the line due to the balance of the retriever body when suspended to slide on the line solely from the first eye; a tether attached to the retriever body at a point below the first eye whereby initial tension on said tether tilts the body to cause the narrowed opening of the second eye to be lowered around the line and further tension on said tether will cause the second eye to slide along said line and abut the enlargement to dislodge the snagged lure or to break it from the line below the enlargement.

3. A retriever body as defined in claim 1 and wherein said opening in said projection is elongated downwardly through its widest section to allow passage of the enlargement on the line for any downward angle of the line while the opening of lesser width in said projection always remains above the line due to the weight of the retriever body.

4. A retriever body as defined in claim 1 and wherein said projection is parallel and approximately axial to an imaginary line between the point of attachment of said tether to the retriever body and the portion of the opening in said projection having the lesser width, and an extension of the fishing line.

5. A fishing line or lure retriever for use on a fishing line of less strength than necessary for lifting a hooked fish out of the water; the line being provided with a lure at its forward end and an enlargement near the lure, the line from the enlargement to the lure being of greater strength than the line between the enlargement and the angler; a retriever body having two sides adapted to straddle the weaker strength line and having two spaced and aligned eyes through which the line passes when the body straddles the line, the eye nearest the angler being only slightly larger than the fishing line and the eye nearest the lure being larger than the enlargement on the fishing line and being wedge shaped tapering to an opening smaller than the enlargement on the line; a tether stronger than the fishing line attached to one of the sides of the retriever body at a point below the eye nearest the angler whereby the retriever body may be slid down the fishing line until the larger eye passes the enlargement and the smaller eye is stopped thereby and pulling on the tether will pivot the body about the smaller eye to cause the apex of the larger eye to engage the line and further pulling on said tether will slide the retriever back up the line to abut the enlargement to enable the hooked fish to be lifted from the water by the tether and the stronger line below the enlargement.

References Cited in the file of this patent

FOREIGN PATENTS 617,392     Great Britain _____ 1949